(12) United States Patent
Nakatsugawa et al.

(10) Patent No.: US 8,575,804 B2
(45) Date of Patent: Nov. 5, 2013

(54) MAGNETIC GEAR

(75) Inventors: Junnosuke Nakatsugawa, Hitachi (JP);
Yuji Enomoto, Hitachi (JP); Hirooki Tokoi, Tokai (JP); Hiroshi Morita, Mito (JP); Norihisa Iwasaki, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 108 days.

(21) Appl. No.: 13/353,345

(22) Filed: Jan. 19, 2012
(Under 37 CFR 1.47)

(65) Prior Publication Data

US 2012/0194021 A1    Aug. 2, 2012

(30) Foreign Application Priority Data

Jan. 28, 2011   (JP) .................................. 2011-015896

(51) Int. Cl.
*H02K 49/00*    (2006.01)

(52) U.S. Cl.
USPC .......................................................... 310/103

(58) Field of Classification Search
USPC .................................... 310/103, 104, 216.113
See application file for complete search history.

(56) References Cited

U.S. PATENT DOCUMENTS

| 7,791,235 B2 * | 9/2010 | Kern et al. ..................... 310/103 |
| 8,063,526 B2 * | 11/2011 | Bright ........................... 310/103 |
| 8,188,629 B2 * | 5/2012 | Peng et al. ..................... 310/103 |
| 2008/0149445 A1 * | 6/2008 | Kern et al. ..................... 192/3.56 |
| 2011/0012458 A1 * | 1/2011 | Atallah et al. ................. 310/103 |
| 2011/0037333 A1 * | 2/2011 | Atallah et al. ................. 310/98 |

FOREIGN PATENT DOCUMENTS

WO    WO 2009/087408 A2    7/2009

OTHER PUBLICATIONS

K. Atallah et al., A Novel High-Performance Magnetic Gear, IEEE Transactions on Magnetics, Jul. 2001, pp. 2844-2846, vol. 37, No. 4.
T. Ikeda et al., A Way to Improve Efficiency of Permanent-Magnet Magnetic Gears, Journal of Magnetics Society of Japan, 2009, pp. 130-134, vol. 33, No. 2.
T. Ikeda et al., Consideration of Rotor Structure in Permanent-Magnet Magnetic Gears, Journal of the Magnetics Society of Japan, 2010, pp. 380-384, Vo. 34, No. 3.

* cited by examiner

*Primary Examiner* — Nguyen N Hanh
(74) *Attorney, Agent, or Firm* — Antonelli, Terry, Stout & Kraus, LLP.

(57) ABSTRACT

A magnetic gear comprises a first permanent magnet field having a plurality of permanent magnet magnetic poles, a second permanent magnet field having a plurality of permanent magnet magnetic poles, number of poles of which magnet is different from that of the first permanent magnet field, and a modulating magnetic pole arranged between the first permanent magnet field and the second permanent magnet field and having a plurality of pole pieces to modulate the number of poles of the first and second permanent magnet fields. Non-magnetic bars are provided between the plurality of pole pieces. One ends of the non-magnetic bars are fixed to a first non-magnetic end holding member and the other ends of the non-magnetic bars are electrically insulated from and fixed to a second non-magnetic end holding member.

12 Claims, 8 Drawing Sheets

MAGNETIC GEAR

BACKGROUND OF THE INVENTION

The present invention relates to a magnetic gear for torque transmission in noncontact.

In recent years, flux modulated type magnetic gears, in which a rare earth magnet is made use of to materialize a high torque density, have been researched and developed (K. Atallah and D. Howe: A Novel High-Performance Magnetic Gear: IEEE Transactions on Magnetics, Vol. 37, No. 4, pp. 2844-2846). In addition, WO2009/087408 discloses an improvement in strength for constituent members of the magnetic gear, in particular, pole pieces.

Also, that construction, in which permanent magnets in a magnetic gear mechanism are divided in a thickness-wise stacking direction, is disclosed in "Consideration with respect to an Improvement in Strength for Permanent Magnet Type Magnetic Gears" (Journal of the Magnetics Society of Japan Vol. 33, No. 2, 2009). That construction, in which a rotor structure in a magnetic gear mechanism is made an interior permanent magnet type, is disclosed in "Consideration with respect to a Rotor Structure of a Permanent Magnet Type Magnetic Gear" (Journal of the Magnetics Society of Japan Vol. 34, No. 3, 2010).

The above-mentioned document "K. Atallah and D. Howe: A Novel High-Performance Magnetic Gear: IEEE Transactions on Magnetics, Vol. 37, No. 4, pp. 2844-2846" presents the principle and magnetic characteristics of a magnetic gear but does not analyze the mechanism and strength thereof.

On the other hand, WO2009/087408 discloses a method, in which one ends of pole pieces of a magnetic gear are joined to an end holding member to provide a rigid structure, thereby achieving an improvement in strength of the pole pieces. Since the pole pieces are formed from a laminated steel sheet, a soft magnetic composite, or the like, however, they are weak in strength and insufficient to achieve high torque driving and large sizing. Also, when a magnetic body is used for the end holding member, magnetic flux of a magnetic gear leaks toward the end holding member to cause decrease in torque transfer characteristics.

Further, WO2009/087408 also discloses a method, in which metallic bars separate from pole pieces are used, both ends of the bars, respectively, are joined to first and second metallic end holding members, and the pole pieces are electrically insulated from the metallic bars to be molded, thereby achieving improvement in strength. However, current loop is formed by the connection of the metallic bars and the metallic end holding members, an induced-current is generated on the metallic bars and the metallic end holding members at the time of driving, and, in particular, a sharp increase in loss is caused at the time of high-speed driving. Also, in the case where the metallic end holding members are formed from a magnetic body, magnetic flux of a permanent magnet leaks toward the end holding members to cause decrease in torque transfer characteristics. In addition, loss caused by an eddy current through a magnetic gear is analyzed in "Consideration with respect to an Improvement in Strength for Permanent Magnet Type Magnetic Gears" (Journal of the Magnetics Society of Japan Vol. 33, No. 2, 2009) and "Consideration with respect to a Rotor Structure of a Permanent Magnet Type Magnetic Gear" (Journal of the Magnetics Society of Japan Vol. 34, No. 3, 2010), but the mechanism and strength of a magnetic gear is not analyzed therein.

The invention has been thought of in view of the above-mentioned problems and has its object to provide a magnetic gear, in which an improvement in strength is achieved for pole pieces and a decrease in loss is made possible.

SUMMARY OF THE INVENTION

In order to solve the above-mentioned problem, for example, it suffices that a magnetic gear comprising a first permanent magnet field having a plurality of permanent magnet magnetic poles, a second permanent magnet field having a plurality of permanent magnet magnetic poles, number of poles of which magnet is different from that of the first permanent magnet field, and a modulating magnetic pole arranged between the first permanent magnet field and the second permanent magnet field and having a plurality of pole pieces to modulate the number of poles of the first and second permanent magnet fields, be constructed such that a plurality of non-magnetic bars are provided between the plurality of pole pieces, and one ends of the plurality of non-magnetic bars are connected to a first non-magnetic end holding member and the other ends of the plurality of non-magnetic bars are electrically insulated from a second non-magnetic end holding member. In a configuration, in which one ends of the plurality of non-magnetic bars are connected to the first non-magnetic end holding member, they may be formed integral, or respective members may be engaged by means of screws or an adhesive.

Also, when the second non-magnetic end holding member is structured to have means (for example, a dent or a hole is provided on the second non-magnetic end holding member, or the second non-magnetic end holding member is shaped to protrude) for preventing structural disassembly caused by a centrifugal force in rotation, it can be improved in resistance to a centrifugal force in rotation.

Also, the non-magnetic bars may be arranged approximately intermediate between the first permanent magnet field and the second permanent magnet field, and the length of the plurality of non-magnetic bars from the first permanent magnet field toward the second permanent magnet field may be different from the length of the pole pieces from the first permanent magnet field toward the second permanent magnet field.

According to the invention, it is possible to increase a magnetic gear in efficiency.

Other objects, features, and advantages of the present invention will become more apparent from the following descriptions of embodiments of the invention when taken in conjunction with the accompanying drawings.

DESCRIPTION OF THE EMBODIMENTS

Subsequently, embodiments of a magnetic gear according to the invention will be described with reference to FIGS. 1 to 9. In addition, while the following embodiments are described with the use of a radial gap type, materialization is likewise possible with respect to other types (for example, axial gap type, linear type, or the like).

[First Embodiment]

Figure 1:
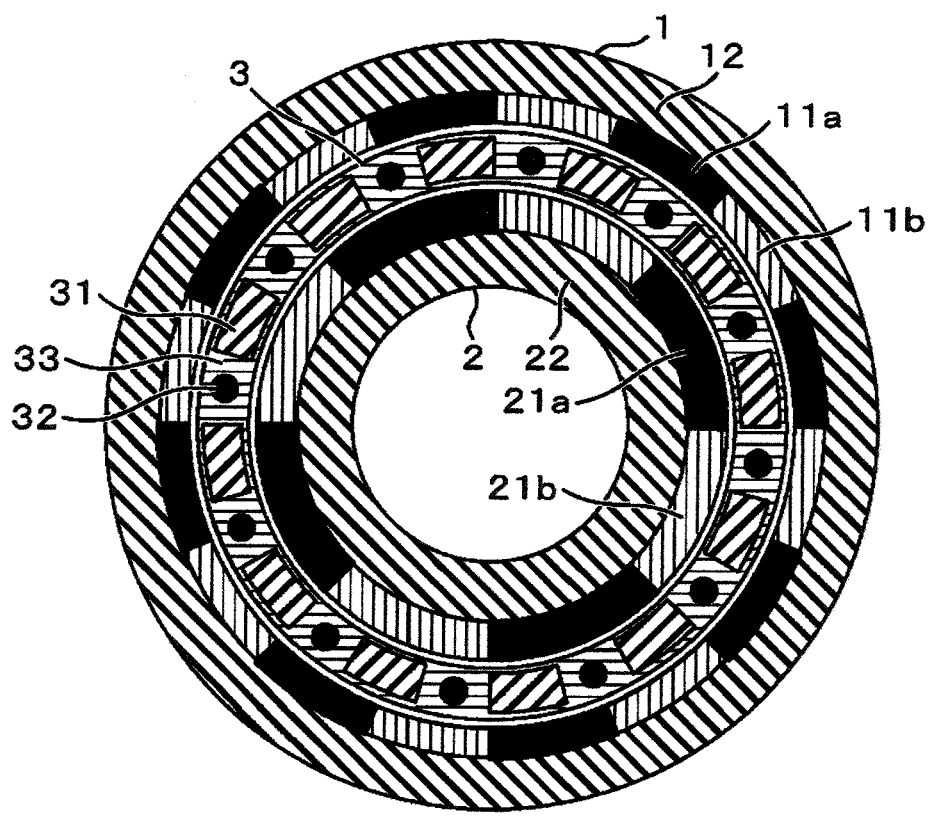
FIG. 1 is a cross sectional view of a magnetic gear according to a first embodiment of the invention.

A first embodiment of the invention will be described below with reference to FIGS. 1, 2A, and 2B.

A magnetic gear comprises a first permanent magnet field 1 having a plurality of permanent magnet magnetic poles, a second permanent magnet field 2 having a plurality of permanent magnet magnetic poles, number of poles of which magnet is different from that of the former permanent magnet magnetic poles, and a modulating magnetic pole 3 having a plurality of pole pieces, and the magnetic gear is structured such that those parts are able to rotate relatively at different speeds from one another.

The first permanent magnet field 1 comprises a plurality of permanent magnet magnetic poles 11a, 11b and a back yoke 12. The second permanent magnet field 2 comprises a plurality of permanent magnet magnetic poles 21a, 21b, that number of poles of which magnet is different from that of the first permanent magnet field 1, and a back yoke 22.

The modulating magnetic pole 3 comprises a plurality of pole pieces 31, number of which is the sum of the number of pole pairs of the first permanent magnet field 1 and the number of pole pairs of the second permanent magnet field 2, a plurality of non-magnetic bars 32 disposed between the pole pieces 31, and a non-magnetic case 33 enclosing the pole pieces 31 and the non-magnetic bars 32.

The pole pieces 31 are formed from electrical steel, a soft magnetic material such as soft magnetic composite, amorphous metal, or permendur, etc., and for electrical steel, thin sheets are laminated with a view to prevent an eddy current caused by a change in magnetic flux.

The non-magnetic case 33 is formed from resin mold, fiber reinforced plastic (FRP), carbon fiber, or glass fiber, etc.

Figure 2A:
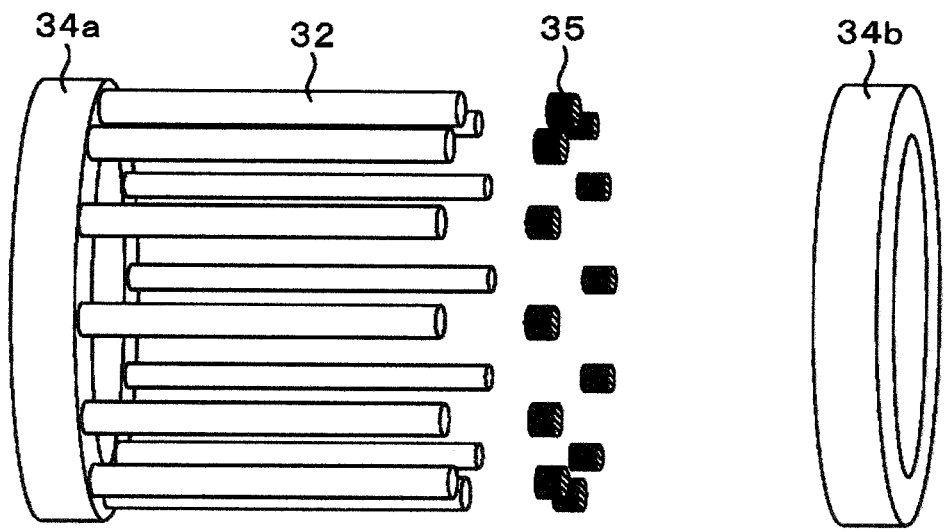
FIG. 2A is an exploded, perspective view of a modulating magnetic pole according to the first embodiment of the invention.
Figure 2B:
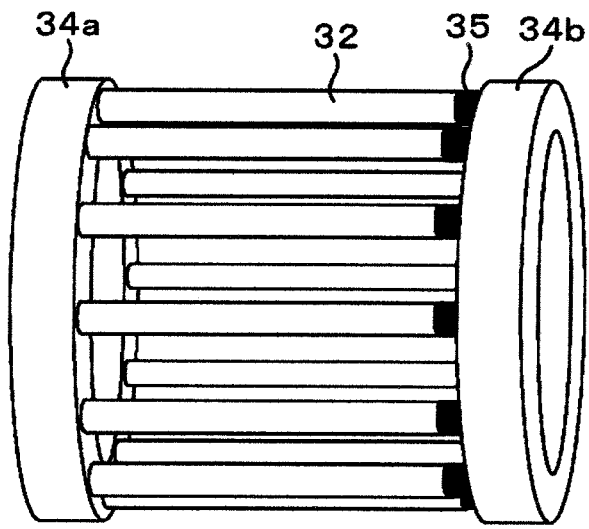
FIG. 2B is a perspective view of the modulating magnetic pole according to the first embodiment of the invention.

As shown in FIG. 2A, one ends of the non-magnetic bars 32 are integratedly formed with the first non-magnetic end holding member 34a, or firmly fixed to the first non-magnetic end holding member 34a by means of screwing or the like. Insulating members 35 are arranged at the other ends of the non-magnetic bars 32 to provide electric insulation between the second non-magnetic end holding member 34b and the non-magnetic bars 32. As shown in FIG. 2B, the non-magnetic bars 32 and the second non-magnetic end holding member 34b are fixed together through the insulating members 35.

For a method of fixing the both together while electrically insulating them from each other, there is conceivable, for example, a method of molding after interposing the insulating members 35 between contact portions of the non-magnetic bars 32 and the non-magnetic end holding member 34b.

Also, a method, in which a molded member serves as the insulating members 35 to mold the whole, can be used, and a method for fixation with the use of non-conductive screws after the insulating members 35 are interposed between contact portions of the non-magnetic bars 32 and the non-magnetic end holding member 34b, or a method of bonding the non-magnetic bars 32 and the non-magnetic end holding member 34b together by means of an adhesive may be used. For example, a construction, in which the pole pieces 31 and the non-magnetic bars 32 are integrated by the non-magnetic case 33, is assumed in the embodiment, in which case the material of the non-magnetic case 33 is made a resin mold whereby a molded member serves as the insulating members 35 to enable simply fabricating the modulating magnetic pole 3.

In addition, in the case where maintenance of strength is possible without the second non-magnetic end holding member 34b, it will do without the use of the second non-magnetic end holding member 34b.

Materials of the non-magnetic bars 32 and the first and second non-magnetic end holding members 34a, 34b include non-magnetic metal such as non-magnetic stainless steel, titanium, aluminum, brass, copper, etc., or FRP, carbon fiber, glass fiber, resin mold, or the like.

Since the pole pieces 31 are made integral with the non-magnetic bars 32 by the non-magnetic case 33 and the non-magnetic bars 32 are integratedly formed with the first non-magnetic end holding member 34a or firmly formed on the first non-magnetic end holding member 34a by means of screwing or the like, they have resistance to a force, such as torque, stress, etc., acting on the pole pieces 31.

One ends of the non-magnetic bars 32 are integratedly formed with the first non-magnetic end holding member 34a or firmly connected to the first non-magnetic end holding member 34a by means of screwing or the like, but the other ends thereof are electrically insulated from the second non-magnetic end holding member 34b, so that there is not formed any current loop, which refluxes through the non-magnetic bars and the non-magnetic end holding member. Accordingly, even when an alternating magnetic field is generated on the non-magnetic bars 32, there is generated only a small current, which refluxes in a single bar, and so it is possible to sharply restrict an eddy current loss of the non-magnetic bars.

Here, since both the first and second non-magnetic end holding members 34a, 34b are formed from a non-magnetic body, even an arrangement, in which they are arranged axially outwardly of a magnetic gear, is not responsible for leakage of magnetic flux and does not cause decrease in torque transfer characteristics.

[Second Embodiment]

Subsequently, a second embodiment of the invention will be described with reference to FIGS. 1, 3A and 3B. In addition, a cross sectional view of a magnetic gear of the second embodiment is the same as that shown in FIG. 1.

Figure 3A:
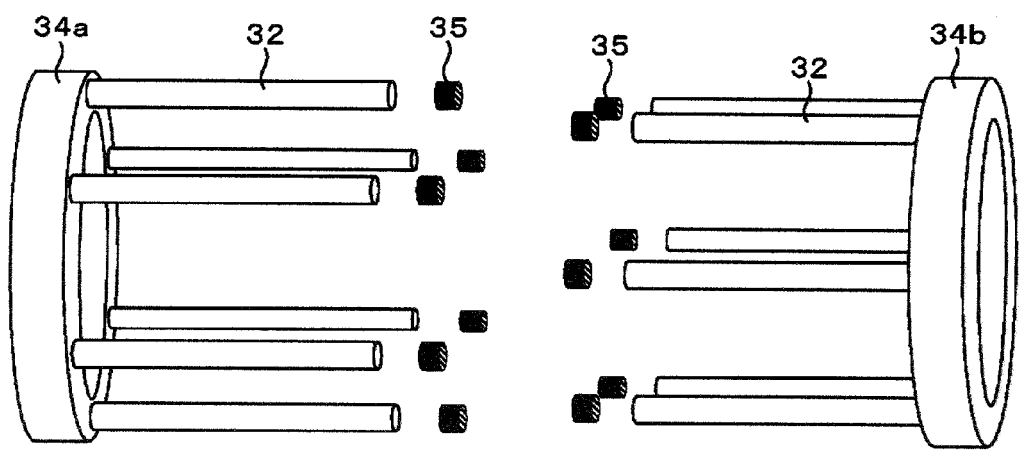
FIG. 3A is an exploded, perspective view of a modulating magnetic pole according to a second embodiment of the invention.

As shown in FIG. 3A, one ends of about a half of a plurality of non-magnetic bars 32 are integratedly formed with a first non-magnetic end holding member 34a or firmly fixed to the first non-magnetic end holding member 34a by means of screwing or the like. Likewise, one ends of about the remaining half of the bars are integratedly formed with a second non-magnetic end holding member 34b or firmly fixed to the second non-magnetic end holding member 34b by means of screwing or the like. Insulating members 35 are arranged at the other ends of the non-magnetic bars 32.

Figure 3B:
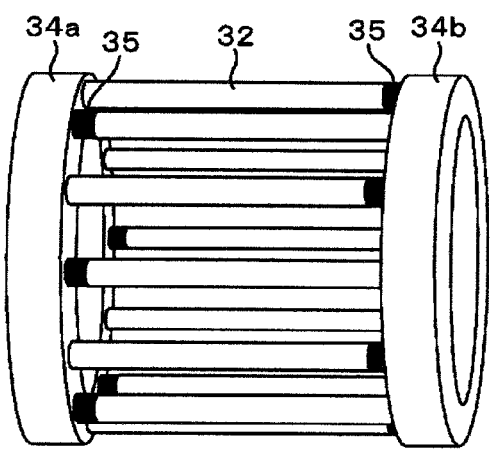
FIG. 3B is a perspective view of the modulating magnetic pole according to the second embodiment of the invention.

As shown in FIG. 3B, the insulating members 35 are arranged alternately at the ends of the non-magnetic bars 32 to be electrically insulated from the first and second non-magnetic end holding members.

Materials of the non-magnetic bars 32 and the first and second non-magnetic end holding members 34a, 34b are the same as those in the first embodiment.

Pole pieces 31 are made integral with the non-magnetic bars 32 by a non-magnetic case 33, a half of the non-magnetic bars 32 are integratedly formed with the first non-magnetic end holding member 34a or firmly fixed to the first non-magnetic end holding member 34a by means of screwing or the like, and the remaining non-magnetic bars 32 are integratedly formed with the second non-magnetic end holding member 34b or firmly fixed to the second non-magnetic end holding member 34b by means of screwing or the like, and therefore, they have resistance to a force, such as torque, stress, etc., acting on the pole pieces 31.

One ends of the non-magnetic bars 32 are connected to the first non-magnetic end holding member 34a or the second non-magnetic end holding member 34b, but the other ends thereof are electrically insulated from them, so that there is not formed any current loop, which refluxes through the non-magnetic bars and the non-magnetic end holding members. Accordingly, even when an alternating magnetic field is generated on the non-magnetic bars 32, there is generated only a small current, which refluxes in a single bar, and so it is possible to sharply restrict an eddy current loss of the non-magnetic bars.

In addition, while FIGS. 3A and 3B show an example, in which on every other non-magnetic bar, a half of the bars are integratedly formed with one of the non-magnetic end holding members and the remaining half of the bars are integratedly formed with the other of the non-magnetic end holding members, such arrangement on every other non-magnetic bar is not necessarily needed but manufacture conformed to design philosophy will do. Also, the number of the non-magnetic bars may be even or odd.

[Third Embodiment]

Subsequently, a third embodiment of the invention will be described with reference to FIGS. 1, 4A, 4B and 4C. In addition, a cross sectional view showing a magnetic gear of the third embodiment is the same as that shown in FIG. 1.

Figure 4A:
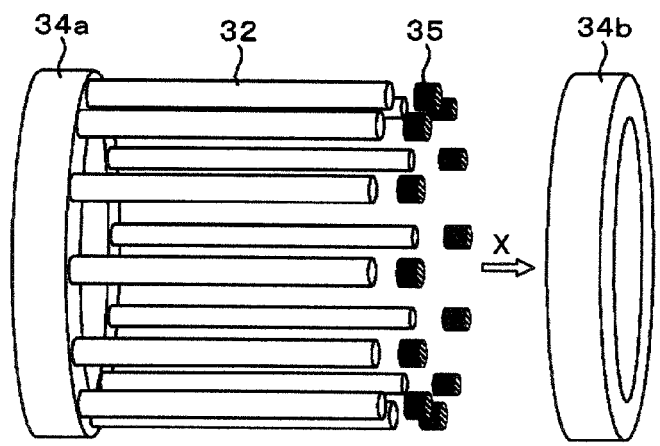
FIG. 4A is an exploded, perspective view of a modulating magnetic pole according to a third embodiment of the invention.
Figure 4C:
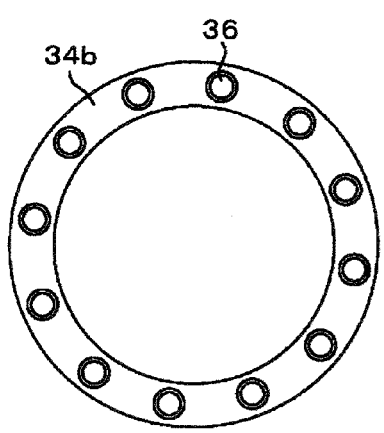
FIG. 4C is a view viewed along an arrow X in FIG. 4A.
Figure 4B:
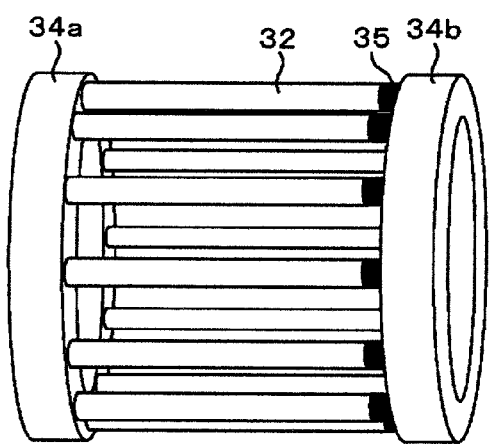
FIG. 4B is a perspective view of the modulating magnetic pole according to the third embodiment of the invention.

As shown in FIG. 4A, one ends of non-magnetic bars 32 are integratedly formed with a first non-magnetic end holding member 34a or firmly fixed to the first non-magnetic end holding member 34a by means of screwing or the like. Insulating members 35 are arranged at the other ends of the non-magnetic bars 32 to provide electric insulation between a second non-magnetic end holding member 34b shown in FIG. 4B and the non-magnetic bars 32. As shown in FIG. 4C, that portion of a surface of the second non-magnetic end holding member 34b, which is electrically insulated from the non-magnetic bars, is provided with dents 36, which are substantially the same shape as the bars, and by fitting the bars into dents with the insulating members 35 therebetween, it is possible as shown in FIG. 4B to fix the bars while electrically insulating the bars and the end holding member from each other.

Materials of the non-magnetic bars 32 and the first and second non-magnetic end holding members 34a, 34b are the same as those in the first embodiment.

Pole pieces 31 are made integral with the non-magnetic bars 32 by a non-magnetic case 33, one ends of the non-magnetic bars 32 are integratedly formed with the first non-magnetic end holding member 34a or firmly fixed to the first non-magnetic end holding member 34a by means of screwing or the like, and the other ends thereof are fitted into dents 36 of the second non-magnetic end holding member 34b with the electrically insulating members 35 therebetween, and therefore they have a great resistance to a force, such as torque, stress, etc., acting on the pole pieces 31.

One ends of the non-magnetic bars 32 are integratedly formed with the first non-magnetic end holding member 34a or connected to the first non-magnetic end holding member 34a by means of screwing or the like, but the other ends thereof are electrically insulated from the second non-magnetic end holding member 34b, so that there is not formed any current loop, which refluxes through the non-magnetic bars and the non-magnetic end holding member. Accordingly, even when an alternating magnetic field is generated on the non-magnetic bars 32, there is generated only a small current, which refluxes in a single bar, and so it is possible to sharply restrict an eddy current loss of the non-magnetic bars.

In addition, there is shown an example, in which all the non-magnetic bars are integratedly formed with the first non-magnetic end holding member, but as illustrated in the second embodiment, a part of the non-magnetic bars may be integratedly formed with the first non-magnetic end holding member and the remaining non-magnetic bars may be integratedly formed with the second non-magnetic end holding member, in which case a further improvement in strength can be achieved by providing dents also on the second non-magnetic end holding member 34b.

[Fourth Embodiment]

Subsequently, a fourth embodiment of the invention will be described with reference to FIGS. 1, 5A, 5B, and 5C. In addition, a cross sectional view showing a magnetic gear of the fourth embodiment is the same as that shown in FIG. 1.

Figure 5A:
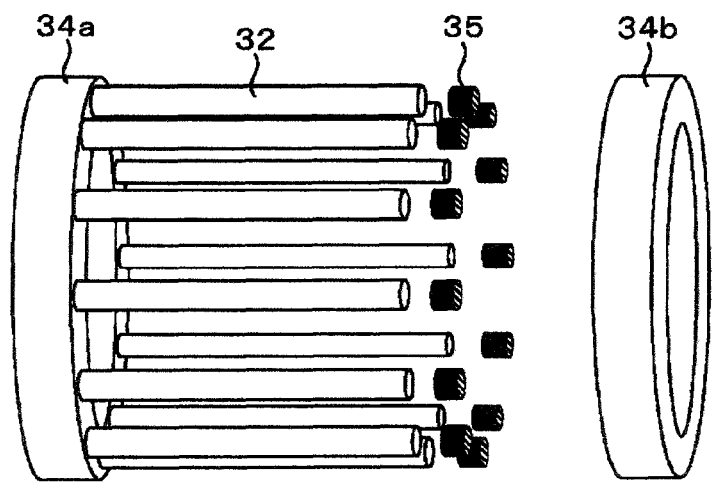
FIG. 5A is an exploded, perspective view of a modulating magnetic pole according to a fourth embodiment of the invention.
Figure 5C:
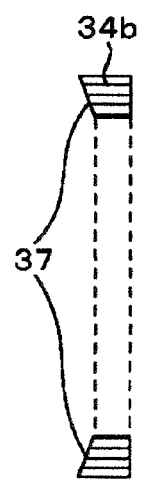
FIG. 5C is a cross sectional view of a second non-magnetic end holding member of the modulating magnetic pole according to the fourth embodiment of the invention.
Figure 5B:
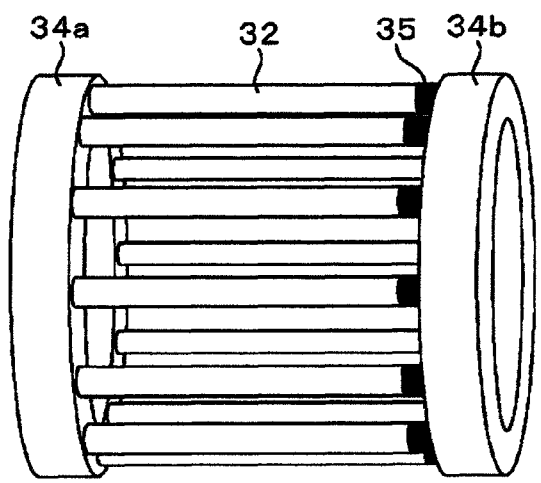
FIG. 5B is a perspective view of the modulating magnetic pole according to the fourth embodiment of the invention.

As shown in FIG. 5A, one ends of non-magnetic bars 32 are integratedly formed with a first non-magnetic end holding member 34a or firmly fixed to the first non-magnetic end holding member 34a by means of screwing or the like. Insulating members 35 are arranged at the other ends of the non-magnetic bars 32 to provide electric insulation between a second non-magnetic end holding member 34b and the non-magnetic bars 32. As shown in FIG. 5C, that portion of a surface of the second non-magnetic end holding member 34b, which is electrically insulated from the non-magnetic bars, is provided with a taper 37 so that the end holding member is gradually increased in wall thickness toward an outer periphery thereof from an inner periphery thereof, and by fitting the bars with insulating members 35 interposed between the non-magnetic bars 32 and the non-magnetic end holding member 34b, it is possible as shown in FIG. 5B to provide resistance to a centrifugal force acting on the bars while electrically insulating the bars and the end holding member from each other.

Materials of the non-magnetic bars 32 and the first and second non-magnetic end holding members 34a, 34b are the same as those in the first embodiment.

Pole pieces 31 are made integral with the non-magnetic bars 32 by a non-magnetic case 33, one ends of the non-magnetic bars 32 are integratedly formed with the first non-magnetic end holding member 34a or firmly formed on the first non-magnetic end holding member 34a by means of screwing or the like, and the other ends thereof are fitted onto the taper 37 of the second non-magnetic end holding member 34b with the electrically insulating members 35 therebetween, and therefore they have resistance to torque, stress, a centrifugal force, etc. acting on the pole pieces 31.

One ends of the non-magnetic bars 32 are integratedly formed with the first non-magnetic end holding member 34a or connected to the first non-magnetic end holding member 34a by means of screwing or the like, but the other ends thereof are electrically insulated from the second non-magnetic end holding member 34b, so that there is not formed any current loop, which refluxes through the non-magnetic bars and the non-magnetic end holding member. Accordingly, even when an alternating magnetic field is generated on the non-magnetic bars 32, there is generated only a small current, which refluxes in a single bar, and so it is possible to sharply restrict an eddy current loss of the non-magnetic bars.

In addition, there is shown an example, in which all the non-magnetic bars are integratedly formed with the first non-magnetic end holding member, but as illustrated in the second embodiment, a part of the non-magnetic bars may be integratedly formed with the first non-magnetic end holding member and the remaining non-magnetic bars may be integratedly formed with the second non-magnetic end holding member, in which case a further improvement in strength can be achieved by providing a taper also on the second non-magnetic end holding member 34b.

Thereby, it is possible to prevent a structural disassembly caused by a centrifugal force in rotation. Here, the structural disassembly means a state, in which the non-magnetic bars 32, the insulating members 35, or the non-magnetic end holding member 34b are caused by a centrifugal force in rotation not to come into contact with one another and broken up.

[Fifth Embodiment]

Subsequently, a fifth embodiment of the invention will be described with reference to FIGS. 1, 6A, 6B, and 6C. In addition, a cross sectional view showing a magnetic gear of the fifth embodiment is the same as that shown in FIG. 1.

Figure 6A:
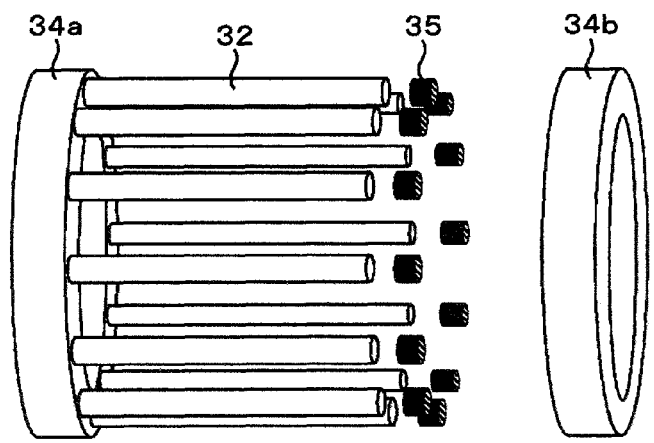
FIG. 6A is an exploded, perspective view of a modulating magnetic pole according to a fifth embodiment of the invention.
Figure 6C:
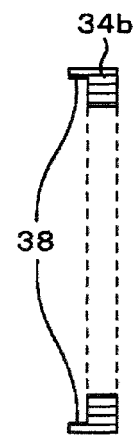
FIG. 6C is a cross sectional view of a second non-magnetic end holding member of the modulating magnetic pole according to the fifth embodiment of the invention.
Figure 6B:
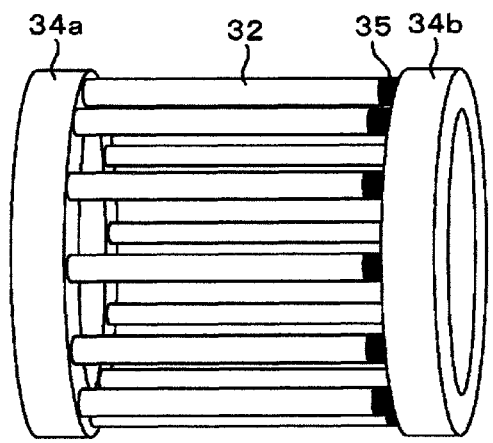
FIG. 6B is a perspective view of the modulating magnetic pole according to the fifth embodiment of the invention.

As shown in FIG. 6A, one ends of non-magnetic bars 32 are integratedly formed with a first non-magnetic end holding member 34a or firmly formed on the first non-magnetic end holding member 34a by means of screwing or the like. Insulating members 35 are arranged at the other ends of the non-magnetic bars 32 to provide electric insulation between a second non-magnetic end holding member 34b and the non-magnetic bars 32. As shown in FIG. 6C, that portion of a surface of the second non-magnetic end holding member 34b, which is electrically insulated from the non-magnetic bars, is provided at an outermost periphery thereof with a projection 38, and by fitting the bars with insulating members 35 interposed between the non-magnetic bars 32 and the non-magnetic end holding member 34b, it is possible to provide resistance to a centrifugal force acting on the bars while electrically insulating the bars and the end holding member from each other.

Materials of the non-magnetic bars 32 and the first and second non-magnetic end holding members 34a, 34b are the same as those in the first embodiment.

Pole pieces 31 are made integral with the non-magnetic bars 32 by a non-magnetic case 33, one ends of the non-magnetic bars 32 are integratedly formed with the first non-magnetic end holding member 34a or firmly formed on the first non-magnetic end holding member 34a by means of screwing or the like, and the other ends thereof are fitted inwardly of the projection 38 at the outermost periphery of the second non-magnetic end holding member 34b with the electrically insulating members 35 therebetween, and therefore they have a great resistance to torque, stress, a centrifugal force, etc., acting on the pole pieces 31.

One ends of the non-magnetic bars 32 are integratedly formed with the first non-magnetic end holding member 34a or connected to the first non-magnetic end holding member 34a by means of screwing or the like, but the other ends thereof are electrically insulated from the second non-magnetic end holding member 34b, so that there is not formed any current loop, which refluxes through the non-magnetic bars and the non-magnetic end holding member. Accordingly, even when an alternating magnetic field is generated on the non-magnetic bars 32, there is generated only a small current, which refluxes in a single bar, and so it is possible to sharply restrict an eddy current loss of the non-magnetic bars.

In addition, there is shown an example, in which all the non-magnetic bars are integratedly formed with the first non-magnetic end holding member, but as illustrated in the second embodiment, a part of the non-magnetic bars may be integratedly formed with the first non-magnetic end holding member and the remaining non-magnetic bars may be integratedly formed with the second non-magnetic end holding member, in which case a further improvement in strength can be achieved by providing a projection also at an outermost periphery of the second non-magnetic end holding member 34b. The configuration of the projection makes it possible to prevent a structural disassembly caused by a centrifugal force in rotation more surely than the tapered structure of the fourth embodiment.

[Sixth Embodiment]

Figure 7:
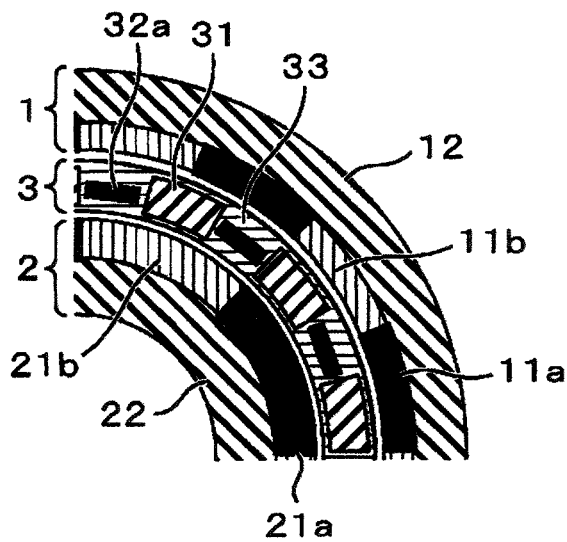
FIG. 7 is a cross sectional view of a one-forth part of a magnetic gear according to a sixth embodiment of the invention.

Subsequently, a sixth embodiment of the invention will be described with reference to FIG. 7.

The embodiment is different from the first to fifth embodiments in that the non-magnetic bars 32 in the first to fifth embodiments are circular-shaped in cross section but non-magnetic bars 32a in the sixth embodiment are rectangular-shaped in cross section to be short in a diametrical direction and to be long in a circumferential direction. Further, the non-magnetic bars 32a are formed to be positioned intermediate between an outer periphery and an inner periphery of a modulating magnetic pole 3.

The non-magnetic bars 32a are rectangular-shaped in cross section to be short in the diametrical direction and to be long in the circumferential direction and formed in an intermediate position between the outer periphery and the inner periphery whereby surfaces of the non-magnetic bars can be arranged in positions most distant from a first permanent magnet field 1 and a second permanent magnet field 2, so that it is possible to achieve a decrease in eddy current loss generated on the non-magnetic bars.

In addition, the construction of the non-magnetic bars 32a and non-magnetic end holding members is provided by manners shown in the first to fifth embodiments. Also, as long as being flat-shaped to be short in the diametrical direction and long in the circumferential direction, the cross sectional shape of the non-magnetic bars 32a is not limited to a rectangle but may be trapezoidal or elliptical, and manufacture conformed to design philosophy in view of the strength and the easiness of fabrication of the bars or the like will do.

[Seventh Embodiment]

Figure 8A:
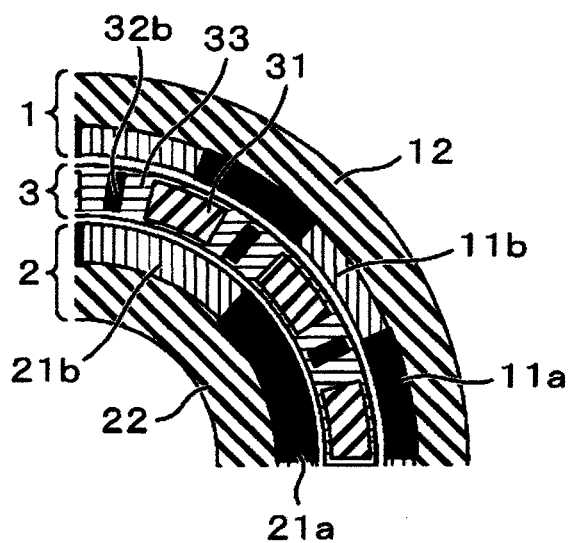
FIG. 8A is a cross sectional view showing a one-forth part of a magnetic gear according to a seventh embodiment of the invention.

Subsequently, a seventh embodiment of the invention will be described with reference to FIGS. 8A and 8B.

The embodiment is different from the sixth embodiment in that the non-magnetic bars 32a in the sixth embodiment are rectangular-shaped in cross section to be short in the diametrical direction and to be long in the circumferential direction, but non-magnetic bars 32b in the seventh embodiment are conversely rectangular-shaped in cross section to be long in a diametrical direction and to be short in a circumferential direction. Further, the non-magnetic bars 32b are formed to be positioned intermediate between adjacent pole pieces 31.

Figure 8B:
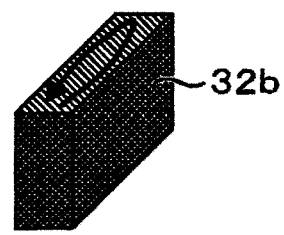
FIG. 8B is a perspective view of a non-magnetic bar of a modulating magnetic pole according to the seventh embodiment of the invention.

The non-magnetic bars 32b are rectangular-shaped in cross section to be long in the diametrical direction and to be short in the circumferential direction and so it is possible as shown in FIG. 8B to decrease an area, in which an eddy current loops, so that it is possible to achieve a decrease in eddy current loss generated on the non-magnetic bars. Also, by forming the non-magnetic bars in intermediate positions between adjacent pole pieces, it is possible to decrease the density of magnetic flux passing through the non-magnetic bars and to achieve a decrease in eddy current loss generated on the non-magnetic bars.

In addition, the construction of the non-magnetic bars 32b and non-magnetic end holding members is provided by methods shown in the first to fifth embodiments. Also, as long as being shaped to be long in the diametrical direction and short in the circumferential direction, the cross sectional shape of the non-magnetic bars 32b is not limited to a rectangle but may be trapezoidal or elliptical, and manufacture conformed to design philosophy in view of the strength and the easiness of fabrication of the bars or the like will do.

[Eighth Embodiment]

Figure 9:
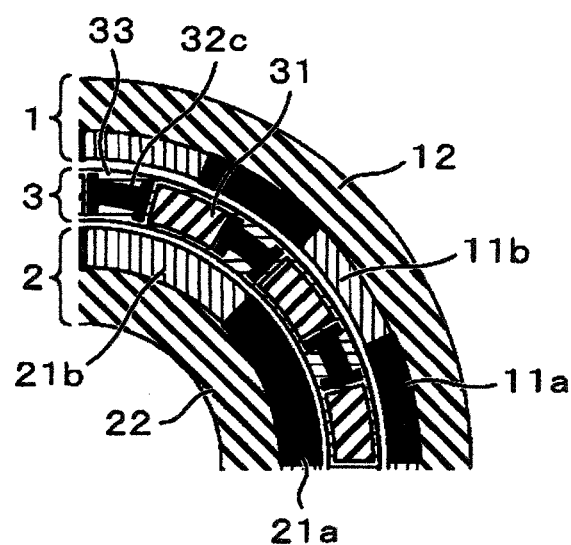
FIG. 9 is a cross sectional view of a one-forth part of a magnetic gear according to an eighth embodiment of the invention.

Subsequently, an eighth embodiment of the invention will be described with reference to FIG. 9.

The embodiment is different from the seventh embodiment in that the non-magnetic bars 32b in the seventh embodiment are rectangular-shaped in cross section to be long in the diametrical direction and to be short in the circumferential direction, but non-magnetic bars 32c in the eighth embodiment are H-shaped in cross section such that a flat rectangle, which is short in the diametrical direction and long in the circumferential direction, has both circumferential ends thereof shaped to have a flat rectangle, which is long in the diametrical direction and short in the circumferential direction.

The non-magnetic bars 32c are H-shaped in cross section whereby both force acting in the diametrical direction and force acting in the circumferential direction can be born by large surfaces, so that a modulating magnetic pole 3 can be improved in strength. Also, large surfaces of the non-magnetic bars can be arranged in positions most distant from a first permanent magnet field 1 and a second permanent magnet field 2, so that it is possible to achieve a decrease in eddy current loss generated on the non-magnetic bars.

In addition, the construction of the non-magnetic bars 32c and non-magnetic end holding members is provided by manners shown in the first to fifth embodiments. Also, the cross sectional shape of the non-magnetic bars 32c is not limited to the H-shape but may be I-shape, and manufacture conformed to design philosophy in view of the strength and the easiness of fabrication of the bars or the like will do.

[Other Embodiments]

In addition, while an explanation has been given using a radial gap type magnetic gear having an air gap in a direction toward an outer periphery of a rotating shaft, the same effect as described above can be produced on other types (for example, an axial gap type one having an air gap in an axial direction of a rotating shaft, a linear type one for rectilinear driving, or the like).

In addition, the magnetic gear described in the embodiments and a rotating electrical machine (motor) may be formed integrally. In this case, a stator iron core may be provided, for example, inwardly of the back yoke 22. Also, a stator iron core may be provided outwardly of the first permanent magnet field 1.

While the embodiments have been described, it is apparent to those skilled in the art that the invention is not limited thereto but various changes and modifications may be made within the spirit of the invention and the scope as defined by the appended claims.

The invention claimed is:

1. A magnetic gear comprising:
a first permanent magnet field having a plurality of permanent magnet magnetic poles;
a second permanent magnet field having a plurality of permanent magnet magnetic poles, number of poles of which magnet is different from that of the first permanent magnet field; and
a modulating magnetic pole arranged between the first permanent magnet field and the second permanent magnet field and having a plurality of pole pieces to modulate the number of poles of the first and second permanent magnet fields,
wherein a plurality of non-magnetic bars are provided between the plurality of pole pieces, and
one ends of the plurality of non-magnetic bars are fixed to a first non-magnetic end holding member and the other ends of the plurality of non-magnetic bars are electrically insulated from and fixed to a second non-magnetic end holding member.

2. The magnetic gear according to claim 1, wherein one ends of about a half of the plurality of non-magnetic bars are connected to the first non-magnetic end holding member and one ends of the remaining non-magnetic bars are connected to the second non-magnetic end holding member.

3. The magnetic gear according to claim 1, wherein that portion of surfaces of the first and second non-magnetic end holding members, which is electrically insulated from the non-magnetic bars, is provided with dents, which have substantially the same shape as the cross sectional shape of the non-magnetic bars, and the non-magnetic bars are fitted into the dents with electrically insulating members therebetween.

4. The magnetic gear according to claim 1, wherein that one of surfaces of the first and second non-magnetic end holding members, which is electrically insulated from the non-magnetic bars, is tapered to be gradually increased in wall thickness toward an outer periphery thereof from an inner periphery thereof.

5. The magnetic gear according to claim 1, wherein that one of surfaces of the first and second non-magnetic end holding members, which is electrically insulated from the non-magnetic bars, is provided at an outermost periphery thereof with a projection.

6. The magnetic gear according to claim 1, wherein the plurality of non-magnetic bars are shorter in length in a direction toward the second permanent magnet field from the first permanent magnet field than the length of the pole pieces in the direction and each of the plurality of non-magnetic bars is arranged in an approximately intermediate position between the first permanent magnet field and the second permanent magnet field.

7. The magnetic gear according to claim 1, wherein the length of the plurality of non-magnetic bars in a direction connecting between adjacent pole pieces is shorter than the length between adjacent pole pieces and each of the plurality of non-magnetic bars is arranged in an approximately intermediate position between adjacent pole pieces.

8. The magnetic gear according to claim 1, wherein the plurality of non-magnetic bars are H-shaped or I-shaped in cross section.

9. The magnetic gear according to claim 1, wherein the plurality of non-magnetic bars and the plurality of pole pieces are molded by a resin to be made integral.

10. A rotating electrical machine formed integral with the magnetic gear according to claim 1.

11. A magnetic gear comprising:
a first permanent magnet field having a plurality of permanent magnet magnetic poles;
a second permanent magnet field having a plurality of permanent magnet magnetic poles, number of poles of which magnet is different from that of the first permanent magnet field; and
a modulating magnetic pole arranged between the first permanent magnet field and the second permanent magnet field and having a plurality of pole pieces to modulate the number of poles of the first and second permanent magnet fields,
wherein a plurality of non-magnetic bars are provided between the plurality of pole pieces,
one ends of the plurality of non-magnetic bars are connected to a first non-magnetic end holding member and the other ends of the plurality of non-magnetic bars are electrically insulated from and connected to a second non-magnetic end holding member, and
the second non-magnetic end holding member comprises means for preventing structural disassembly caused by a centrifugal force in rotation.

12. A magnetic gear comprising:
a first permanent magnet field having a plurality of permanent magnet magnetic poles;
a second permanent magnet field having a plurality of permanent magnet magnetic poles, number of poles of which magnet is different from that of the first permanent magnet field; and
a modulating magnetic pole arranged between the first permanent magnet field and the second permanent magnet field and having a plurality of pole pieces to modulate the number of poles of the first and second permanent magnet fields,
wherein a plurality of non-magnetic bars are provided between the plurality of pole pieces,
one ends of the plurality of non-magnetic bars are connected to a first non-magnetic end holding member and the other ends of the plurality of non-magnetic bars are electrically insulated from and connected to a second non-magnetic end holding member,
the plurality of non-magnetic bars are arranged approximately intermediate between the first permanent magnet field and the second permanent magnet field, and
length of the plurality of non-magnetic bars from the first permanent magnet field toward the second permanent magnet field is different from length of the pole pieces from the first permanent magnet field toward the second permanent magnet field.

* * * * *